(12) United States Patent
Kittichokechai et al.

(10) Patent No.: US 12,446,021 B2
(45) Date of Patent: Oct. 14, 2025

(54) TYPE-1 HARQ-ACK CODEBOOK IN PUCCH FOR SUB-SLOT HARQ-ACK

(71) Applicant: TELEFONAKTIEBOLAGET LM ERICSSON (PUBL), Stockholm (SE)

(72) Inventors: Kittipong Kittichokechai, Järfälla (SE); Sorour Falahati, Stockholm (SE); Yufei Blankenship, Kildeer, IL (US); Bikramjit Singh, Raasepori (FI); Jonas Fröberg Olsson, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 18/033,033

(22) PCT Filed: Oct. 20, 2021

(86) PCT No.: PCT/IB2021/059694
§ 371 (c)(1),
(2) Date: Apr. 20, 2023

(87) PCT Pub. No.: WO2022/084894
PCT Pub. Date: Apr. 28, 2022

(65) Prior Publication Data
US 2023/0397183 A1    Dec. 7, 2023

Related U.S. Application Data

(60) Provisional application No. 63/094,195, filed on Oct. 20, 2020.

(51) Int. Cl.
*H04J 3/00* (2006.01)
*H04W 72/0446* (2023.01)
*H04W 72/11* (2023.01)

(52) U.S. Cl.
CPC ........ *H04W 72/11* (2023.01); *H04W 72/0446* (2013.01)

(58) Field of Classification Search
CPC .................. H04W 72/11; H04W 72/0446
(Continued)

(56) References Cited

U.S. PATENT DOCUMENTS

2019/0082448 A1* 3/2019 Nogami ............... H04L 5/0053
2019/0254053 A1* 8/2019 Ying ....................... H04L 5/00
2020/0213046 A1  7/2020 Wang et al.

OTHER PUBLICATIONS

3GPP TS 38.213 v16.3.0, "3rd Generation Partnership Project; Technical Specification Group Radio Access Network; NR; Physical layer procedures for control", 3GPP TS 38.213 V16.3.0, Sep. 2020.
(Continued)

*Primary Examiner* — Temica M Beamer

(57) ABSTRACT

Systems and methods for providing feedback are provided. In some embodiments, a method performed by a wireless device includes: determining a set of occasions for candidate PDSCH receptions taking into account the number of sub-slots in an uplink slot; determining a set of occasions for Semi-Persistent Scheduling (SPS) PDSCH releases taking into account the number of sub-slots; the number of sub-slots is used to scale the number of downlink slots within an uplink slot when determining a set of occasions for candidate PDSCH receptions; and the number of sub-slots is used to scale the number of downlink slots within an uplink slot when determining a set of occasions for SPS PDSCH releases. Some embodiments allow for a full support of Type-1 HARQ-ACK codebook for subslot-based HARQ-ACK. Some embodiments are simple to implement into the specification and preserve the existing behavior for the slot-based Type-1 HARQ-ACK codebook determination.

24 Claims, 13 Drawing Sheets

(58) Field of Classification Search
USPC .......................................................... 370/336
See application file for complete search history.

(56) References Cited

OTHER PUBLICATIONS

3GPP TS 38.214 V16.3.0, 3rd Generation Partnership Project; Technical Specification Group Radio Access Network; NR; Physical layer procedures for data, Sep. 2020.
OPPO (Moderator), R1-2002695, "Summary#1 on UCI enhancements for R16 URLLC", 3GPP TSG RAN WG1 #101b-e, R1-2002695, e-Meeting, Apr. 20-30, 2020.
OPPO (Moderator), R1-2004674, Summary#1 on UCI enhancements for R16 URLLC, 3GPP TSG RAN WG1 #101b-e, R1-2004674, e-Meeting, Apr. 20-30, 2020.
OPPO (Moderator), R1-2007448, "Summary#3 of email thread [102-e-NR-L1enh_URLLC-UCI_Enh-02]", 3GPP TSG RAN WG1 #102e, R1-2007448, e-Meeting, Aug. 17-28, 2020.

* cited by examiner

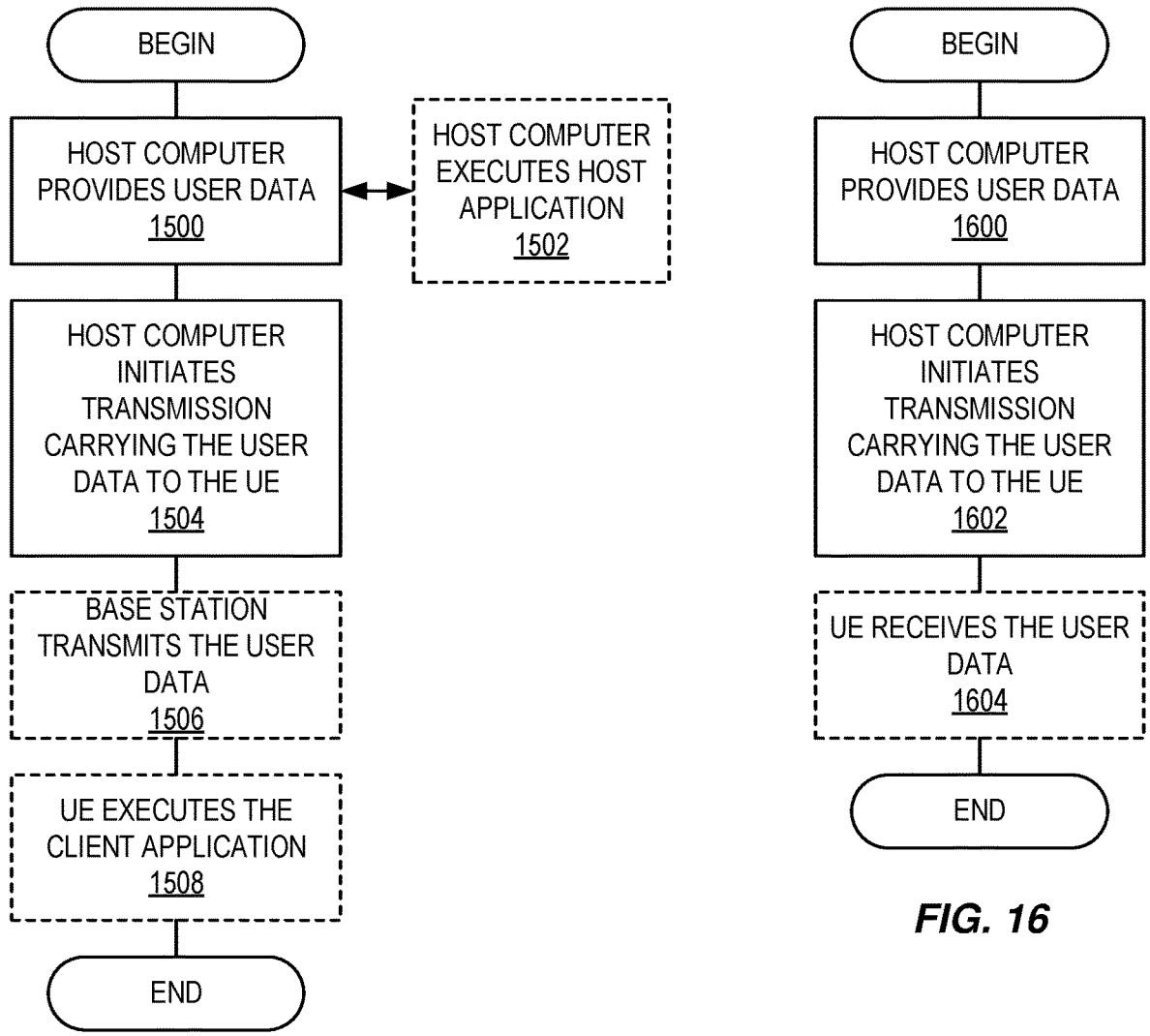

TYPE-1 HARQ-ACK CODEBOOK IN PUCCH FOR SUB-SLOT HARQ-ACK

RELATED APPLICATIONS

This application is a national phase application of International Patent Application No. PCT/IB2021/059694, filed Oct. 20, 2021, which claims the benefit of U.S. Provisional Patent Application No. 63/094,195, filed Oct. 20, 2020, the disclosure of which are hereby incorporated herein by reference in their entirety.

TECHNICAL FIELD

The present disclosure relates to providing feedback.

BACKGROUND

New radio (NR) standard in 3GPP is designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot is a concept that is used in scheduling and in DL a min-slot can consist of 2, 4, or 7 OFDM symbols, while in UL a mini-slot can be any number of 1 to 14 OFDM symbols. It should be noted that the concepts of slot and mini-slot are not specific to a specific service meaning that a mini-slot may be used for either eMBB, URLLC, or other services.

In 3GPP NR standard, downlink control information (DCI) which is transmitted in physical downlink control channel (PDCCH), is used to indicate the DL data related information, UL related information, power control information, slot format indication, etc. There are different formats of DCI associated with each of these control signals and the UE identifies them based on different radio network temporary identifiers (RNTIs).

A UE is configured by higher layer signaling to monitor for DCIs in different resources with different periodicities, etc. DCI formats 1_0, 1_1, and 1_2 are used for scheduling DL data which is sent in physical downlink shard channel (PDSCH), and includes time and frequency resources for DL transmission, as well as modulation and coding information, HARQ (hybrid automatic repeat request) information, etc.

In case of DL semi-persistent scheduling (SPS) and UL configured grant type 2, part of the scheduling including the periodicity is provided by the higher layer configurations, while the rest of scheduling information such as time domain and frequency domain resource allocation, modulation and coding, etc., are provided by the DCI in PDCCH.

Uplink Control Information

Uplink control information (UCI) is a control information sent by a UE to a gNB. It consists of Hybrid-ARQ acknowledgement (HARQ-ACK) which is a feedback information corresponding to the received downlink transport block whether the transport block reception is successful or not, Channel state information (CSI) related to downlink channel conditions which provides gNB with channel-related information useful for DL scheduling, including information for multi-antenna and beamforming schemes, and Scheduling request (SR) which indicates a need of UL resources for UL data transmission UCI is typically transmitted on physical uplink control channel (PUCCH). However, if a UE is transmitting data on the PUSCH with a valid PUSCH resource overlapping with PUCCH, UCI can be multiplexed with UL data and transmitted on PUSCH instead, if the timeline requirements for UCI multiplexing is met.

Physical Uplink Control Channel

Physical Uplink Control Channel (PUCCH) is used by a UE to transmit HARQ-ACK feedback message corresponding to the reception of DL data transmission. It is also used by the UE to send channel state information (CSI) or to request for an uplink grant for transmitting UL data.

In NR, there exist multiple PUCCH formats supporting different UCI payload sizes. PUCCH formats 0 and 1 support UCI up to 2 bits, while PUCCH formats 2, 3, and 4 can support UCI of more than 2 bits. In terms of PUCCH transmission duration, PUCCH formats 0 and 2 are considered short PUCCH formats supporting PUCCH duration of 1 or 2 OFDM symbols, while PUCCH formats 1, 3, and 4 are considered as long formats and can support PUCCH duration from 4 to 14 symbols.

HARQ Feedback

The procedure for receiving downlink transmission is that the UE first monitors and decodes a PDDCH in slot n which points to a DL data scheduled in slot $n+K_0$ slots ($K_0$ is larger than or equal to 0). The UE then decodes the data in the corresponding PDSCH. Finally based on the outcome of the decoding the UE sends an acknowledgement of the correct decoding (ACK) or a negative acknowledgement (NACK) to the gNB at time slot $n+K_0+K_1$ (in case of slot aggregation $n+K_0$ would be replaced by the slot where PDSCH ends). Both of $K_0$ and $K_1$ are indicated in the DCI. The resources for sending the acknowledgement are indicated by PUCCH resource indicator (PRI) field in the DCI which points to one of PUCCH resources that are configured by higher layers.

Depending on DL/UL slot configurations, or whether carrier aggregation, or per code-block group (CBG) transmission used in the DL, the feedback for several PDSCHs may need to be multiplexed in one feedback. This is done by constructing HARQ-ACK codebooks. In NR, the UE can be configured to multiplex the A/N bits using a semi-static codebook or a dynamic codebook.

Type 1 or semi-static codebook consists of a bit sequence where each element contains the A/N bit from a possible allocation in a certain slot, carrier, or transport block (TB). When the UE is configured with CBG and/or time-domain resource allocation (TDRA) table with multiple entries, multiple bits are generated per slot and TB (see below). It is important to note that the codebook is derived regardless of the actual PDSCH scheduling. The size and format of the semi-static codebook is preconfigured based on the mentioned parameters. The drawback of semi-static HARQ ACK codebook is that the size is fixed, and regardless of whether there is a transmission or not a bit is reserved in the feedback matrix.

On the case when a UE has a TDRA table with multiple time-domain resource allocation entries configured: The table is pruned (i.e., entries are removed based on a specified algorithm) to derive a TDRA table that only contains non-overlapping time-domain allocations. One bit is then reserved in the HARQ CB for each non-overlapping entry (assuming a UE is capable of supporting reception of multiple PDSCH in a slot).

To avoid reserving unnecessary bits in a semi-static HARQ codebook, in NR a UE can be configured to use a type 2 or dynamic HARQ codebook, where an A/N bit is present only if there is a corresponding transmission scheduled. To avoid any confusion between the gNB and the UE, on the number of PDSCHs that the UE has to send a feedback for, a counter downlink assignment indicator (DAI) field exists in DL assignment, which denotes accumulative number of {serving cell, PDCCH occasion} pairs in which a PDSCH is scheduled to a UE up to the current PDCCH. In addition to that, there is another field called total DAI, which when present shows the total number of {serving cell, PDCCH occasion} up to (and including) all PDCCHs of the current PDCCH monitoring occasion. The timing for sending HARQ feedback is determined based on both PDSCH transmission slot with reference to PDCCH slot ($K_0$) and the PUCCH slot that contains HARQ feedback ($K_1$).

FIG. 1 illustrates an exemplary radio resource in NR. FIG. 2 illustrates the timeline in a simple scenario with two PDSCHs and one feedback. In this example there is in total four PUCCH resources configured, and the PRI indicates PUCCH 2 to be used for HARQ feedback. The following explains how PUCCH 2 is selected from four PUCCH resources based on the procedure in Rel-15.

New radio (NR) standard in 3GPP is designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR in addition to transmission in a slot, a mini-slot transmission is also allowed to reduce latency. A mini-slot is a concept that is used in scheduling and in DL a min-slot can consist of 2, 4 or 7 OFDM symbols, while in UL a mini-slot can be any number of 1 to 14 OFDM symbols. It should be noted that the concepts of slot and mini-slot are not specific to a specific service meaning that a mini-slot may be used for either eMBB, URLLC, or other services.

Downlink Control Information

In 3GPP NR standard, downlink control information (DCI) which is transmitted in physical downlink control channel (PDCCH), is used to indicate the DL data related information, UL related information, power control information, slot format indication, etc. There are different formats of DCI associated with each of these control signals and the UE identifies them based on different radio network temporary identifiers (RNTIs).

A UE is configured by higher layer signaling to monitor for DCIs in different resources with different periodicities, etc. DCI formats 1_0, 1_1, and 1_2 are used for scheduling DL data which is sent in physical downlink shard channel (PDSCH), and includes time and frequency resources for DL transmission, as well as modulation and coding information, HARQ (hybrid automatic repeat request) information, etc.

In case of DL semi-persistent scheduling (SPS) and UL configured grant type 2, part of the scheduling including the periodicity is provided by the higher layer configurations, while the rest of scheduling information such as time domain and frequency domain resource allocation, modulation and coding, etc., are provided by the DCI in PDCCH.

Uplink Control Information

Uplink control information (UCI) is a control information sent by a UE to a gNB. It consists of Hybrid-ARQ acknowledgement (HARQ-ACK) which is a feedback information corresponding to the received downlink transport block whether the transport block reception is successful or not, Channel state information (CSI) related to downlink channel conditions which provides gNB with channel-related information useful for DL scheduling, including information for multi-antenna and beamforming schemes, and Scheduling request (SR) which indicates a need of UL resources for UL data transmission UCI is typically transmitted on physical uplink control channel (PUCCH). However, if a UE is transmitting data on the PUSCH with a valid PUSCH resource overlapping with PUCCH, UCI can be multiplexed with UL data and transmitted on PUSCH instead, if the timeline requirements for UCI multiplexing is met.

Physical Uplink Control Channel

Physical Uplink Control Channel (PUCCH) is used by a UE to transmit HARQ-ACK feedback message corresponding to the reception of DL data transmission. It is also used by the UE to send channel state information (CSI) or to request for an uplink grant for transmitting UL data.

In NR, there exist multiple PUCCH formats supporting different UCI payload sizes. PUCCH formats 0 and 1 support UCI up to 2 bits, while PUCCH formats 2, 3, and 4 can support UCI of more than 2 bits. In terms of PUCCH transmission duration, PUCCH formats 0 and 2 are considered short PUCCH formats supporting PUCCH duration of 1 or 2 OFDM symbols, while PUCCH formats 1, 3, and 4 are considered as long formats and can support PUCCH duration from 4 to 14 symbols.

HARQ Feedback

The procedure for receiving downlink transmission is that the UE first monitors and decodes a PDDCH in slot n which points to a DL data scheduled in slot $n+K_0$ slots ($K_0$ is larger than or equal to 0). The UE then decodes the data in the corresponding PDSCH. Finally based on the outcome of the decoding the UE sends an acknowledgement of the correct decoding (ACK) or a negative acknowledgement (NACK) to the gNB at time slot $n+K_0+K_1$ (in case of slot aggregation $n+K_0$ would be replaced by the slot where PDSCH ends). Both of $K_0$ and $K_1$ are indicated in the DCI. The resources for sending the acknowledgement are indicated by PUCCH resource indicator (PRI) field in the DCI which points to one of PUCCH resources that are configured by higher layers.

Depending on DL/UL slot configurations, or whether carrier aggregation, or per code-block group (CBG) transmission used in the DL, the feedback for several PDSCHs may need to be multiplexed in one feedback. This is done by constructing HARQ-ACK codebooks. In NR, the UE can be configured to multiplex the A/N bits using a semi-static codebook or a dynamic codebook.

Type 1 or semi-static codebook consists of a bit sequence where each element contains the A/N bit from a possible allocation in a certain slot, carrier, or transport block (TB). When the UE is configured with CBG and/or time-domain resource allocation (TDRA) table with multiple entries, multiple bits are generated per slot and TB (see below). It is important to note that the codebook is derived regardless of the actual PDSCH scheduling. The size and format of the semi-static codebook is preconfigured based on the mentioned parameters. The drawback of semi-static HARQ ACK codebook is that the size is fixed, and regardless of whether there is a transmission or not a bit is reserved in the feedback matrix.

On the case when a UE has a TDRA table with multiple time-domain resource allocation entries configured: The table is pruned (i.e., entries are removed based on a specified algorithm) to derive a TDRA table that only contains non-overlapping time-domain allocations. One bit is then reserved in the HARQ codebook for each non-overlapping entry (assuming a UE is capable of supporting reception of multiple PDSCH in a slot).

To avoid reserving unnecessary bits in a semi-static HARQ codebook, in NR a UE can be configured to use a type 2 or dynamic HARQ codebook, where an A/N bit is present only if there is a corresponding transmission scheduled. To avoid any confusion between the gNB and the UE, on the number of PDSCHs that the UE has to send a feedback for, a counter downlink assignment indicator (DAI) field exists in DL assignment, which denotes accumulative number of {serving cell, PDCCH occasion} pairs in which a PDSCH is scheduled to a UE up to the current PDCCH. In addition to that, there is another field called total DAI, which when present shows the total number of {serving cell, PDCCH occasion} up to (and including) all PDCCHs of the current PDCCH monitoring occasion. The timing for sending HARQ feedback is determined based on both PDSCH transmission slot with reference to PDCCH slot ($K_0$) and the PUCCH slot that contains HARQ feedback ($K_1$).

FIG. 2 illustrates the timeline in a simple scenario with two PDSCHs and one feedback. In this example there is in total 4 PUCCH resources configured, and the PRI indicates PUCCH 2 to be used for HARQ feedback. The following explains how PUCCH 2 is selected from four PUCCH resources based on the procedure in Rel-15.

In NR Rel-15, a UE can be configured with maximum 4 PUCCH resource sets for transmission of HARQ-ACK information. Each set is associated with a range of UCI payload bits including HARQ-ACK bits. The first set is always associated to 1 or 2 HARQ-ACK bits and both includes only PUCCH format 0 or 1 or both. The range of payload values (minimum of maximum values) for other sets, if configured, is provided by configuration except the maximum value for the last set where a default value is used, and the minimum value of the second set being 3. The first set can include maximum 32 PUCCH resources of PUCCH format 0 or 1. Other sets can include maximum 8 bits of format 2 or 3 or 4.

As described previously, the UE determines a slot for transmission of HARQ-ACK bits in a PUCCH corresponding to PDSCHs scheduled or activated by DCI via $K_1$ value provided by configuration or a field in the corresponding DCI. The UE forms a codebook from the HARQ-ACK bits with associated PUCCH in a same slot via corresponding $K_1$ values.

The UE determines a PUCCH resource set that the size of the codebook is within the corresponding range of payload values associated to that set.

The UE determines a PUCCH resource in that set if the set is configured with maximum 8 PUCCH resources, by a field in the last DCI associated to the corresponding PDSCHs. If the set is the first set and is configured with more than 8 resources, a PUCCH resource in that set is determined by a field in the last DCI associated to the corresponding PDSCHs and implicit rules based on the CCE.

A PUCCH resource for HARQ-ACK transmission can overlap in time with other PUCCH resources for CSI and/or SR transmissions as well as PUSCH transmissions in a slot. In case of overlapping PUCCH and/or PUSCH resources, first the UE resolves overlapping between PUCCH resources, if any, by determining a PUCCH resource carrying the total UCI (including HARQ-ACK bits) such that the UCI multiplexing timeline requirements are met. There might be partial or completely dropping of CSI bits, if any, to multiplex the UCI in the determined PUCCH resource. Then, the UE resolves overlapping between PUCCH and PUSCH resources, if any, by multiplexing the UCI on the PUSCH resource if the timeline requirements for UCI multiplexing is met.

Sub-Slot HARQ-ACK

In NR Rel-16, an enhancement on HARQ-ACK feedback is made to support more than one PUCCH carrying HARQ-ACK in a slot for supporting different services and for possible fast HARQ-ACK feedback for URLLC. This leads to an introduction of new HARQ-ACK timing in a unit of sub-slot, i.e., K1 indication in a unit of sub-slot. Sub-slot configurations for PUCCH carrying HARQ-ACK can be configured from the two options, namely "2-symbol*7" and "7-symbol*2" for the sub-slot length of 2 symbols and 7 symbols, respectively. The indication of K1 is the same as that of Rel-15, that is, K1 is indicated in the DCI scheduling PDSCH. To determine the HARQ-ACK timing, there exists an association of PDSCH to sub-slot configuration in that if the scheduled PDSCH ends in sub-slot n, the corresponding HARQ-ACK is reported in sub-slot n+K1. In a sense, sub-slot based HARQ-ACK timing works similarly to that of Rel-15 slot-based procedure by replacing the unit of K1 from slot to sub-slot.

There exist some limitations on PUCCH resources for sub-slot HARQ-ACK. That is, only one PUCCH resource configuration is used for all sub-slots in a slot. Moreover, any PUCCH resource for sub-slot HARQ-ACK cannot cross sub-slot boundaries.

FIG. 3 shows an example where each PDSCH is associated with a certain sub-slot for HARQ feedback through the use of a K1 value in units of sub-slots.

There currently exist certain challenges. The current NR specification does not fully support Type-1 HARQ-ACK codebook for subslot-based HARQ-ACK. As such, improved systems and methods for providing feedback are needed.

SUMMARY

Systems and methods for providing feedback are provided. In some embodiments, a method performed by a wireless device for providing feedback includes: determining a set of occasions for candidate Physical Downlink Shared Channel (PDSCH) receptions taking into account the number of sub-slots in an Uplink (UL) slot; determining a set of occasions for Semi-Persistent Scheduling (SPS) PDSCH releases taking into account the number of sub-slots in an UL slot; the number of sub-slots in an UL slot is used to scale the number of Downlink (DL) slots within an UL slot when determining a set of occasions for candidate PDSCH receptions; and the number of sub-slots in an UL slot is used to scale the number of DL slots within an UL slot when determining a set of occasions for SPS PDSCH releases. In this way, some embodiments allow for a full support of Type-1 HARQ-ACK codebook for subslot-based HARQ-ACK. Some embodiments are simple to implement into the specification and preserve the existing behavior for the slot-based Type-1 HARQ-ACK codebook determination.

Certain aspects of the present disclosure and their embodiments may provide solutions to the aforementioned or other challenges. The proposed solutions provide methods to enable the full support of Type-1 HARQ-ACK codebook for subslot-based HARQ-ACK.

In the main solution, the number of sub-slots within an UL slot is taken into account when determining a set of occasions for candidate PDSCH receptions or SPS PDSCH releases.

In an alternative solution, DL slot is considered in terms of sub-slot following the sub-slot length configuration, i.e., for the purpose of determining Type-1 HARQ-ACK codebook for subslot-based HARQ-ACK, DL slot can be assumed to consists of multiple DL sub-slots.

There are, proposed herein, various embodiments which address one or more of the issues disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15, 16, 17 and 18 are flowcharts illustrating methods implemented in a communication system, according to some embodiments of the present disclosure.

DETAILED DESCRIPTION

Figure 1:
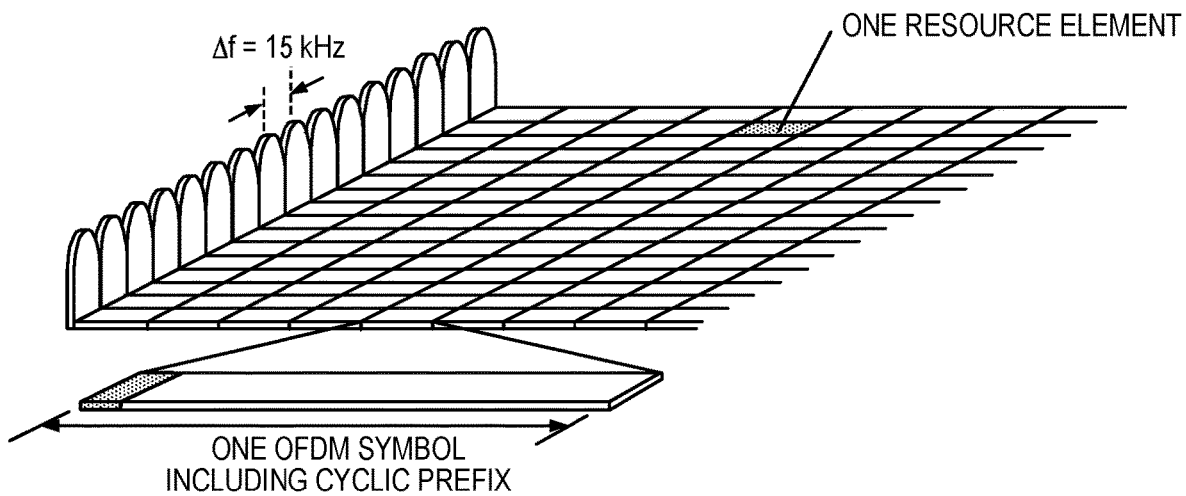
FIG. 1 illustrates an exemplary radio resource in New Radio (NR)
Figure 2:
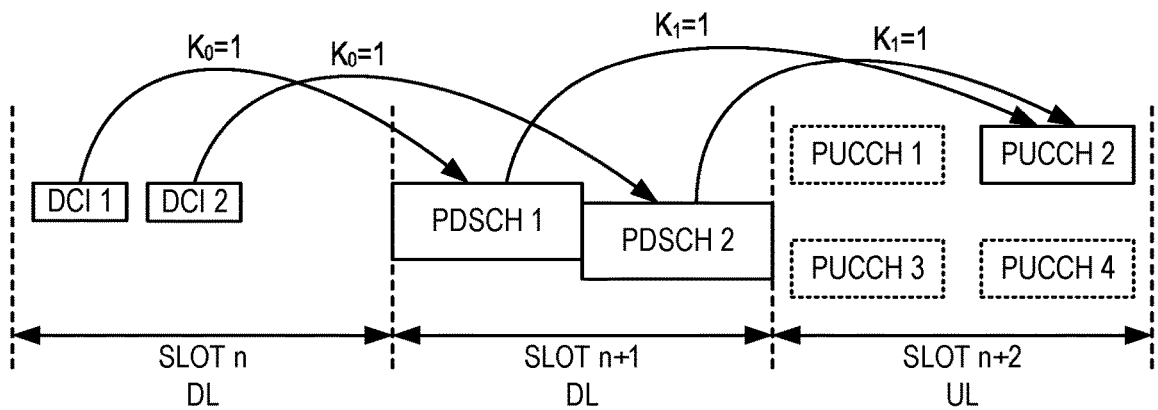
FIG. 2 illustrates the timeline in a simple scenario with two Physical Downlink Shared Channels (PDSCHs) and one feedback.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
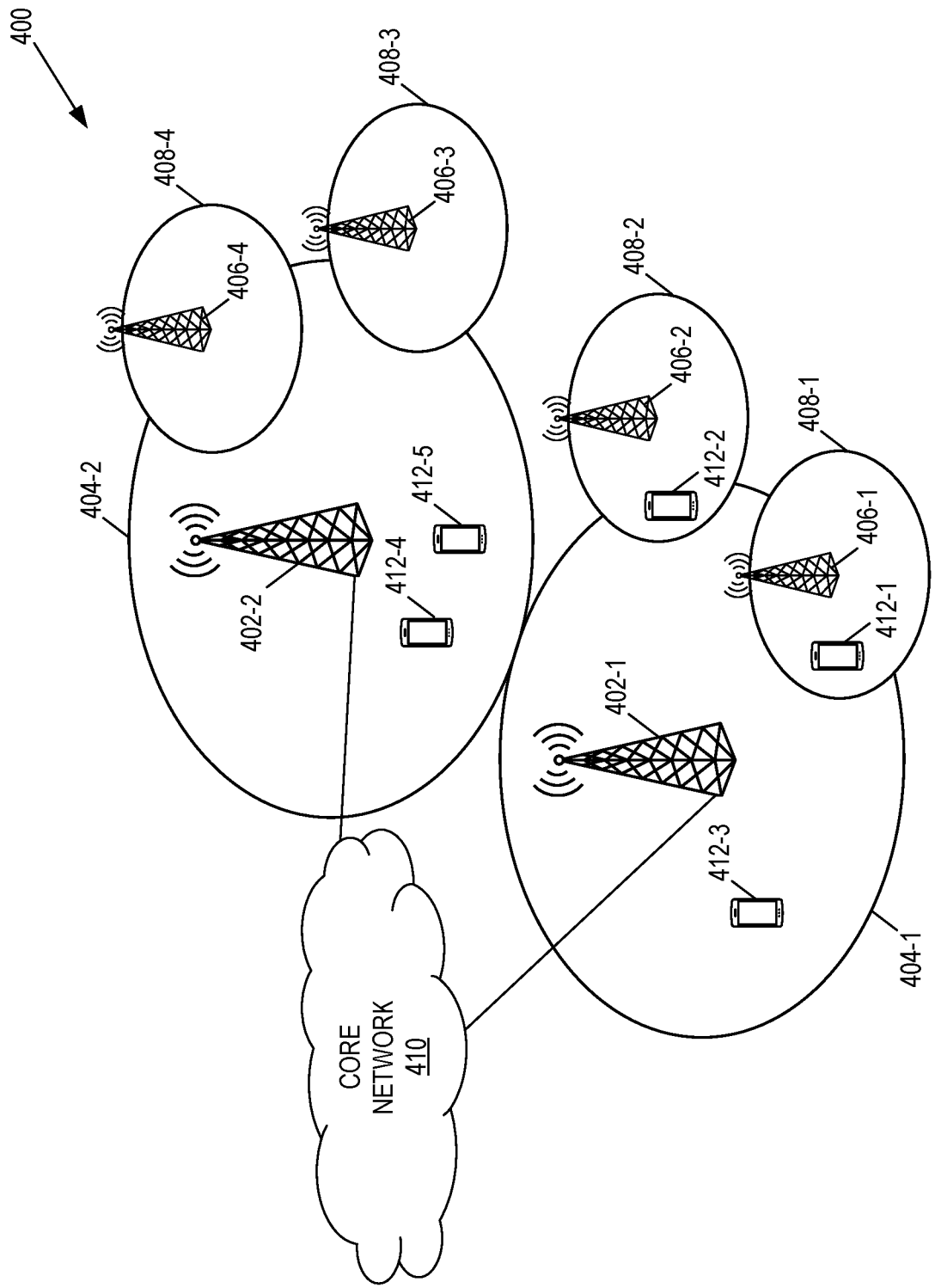
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC). In this example, the RAN includes base stations 402-1 and 402-2, which in the 5GS include NR base stations (gNBs) and optionally next generation eNBs (ng-eNBs) (e.g., LTE RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 3:
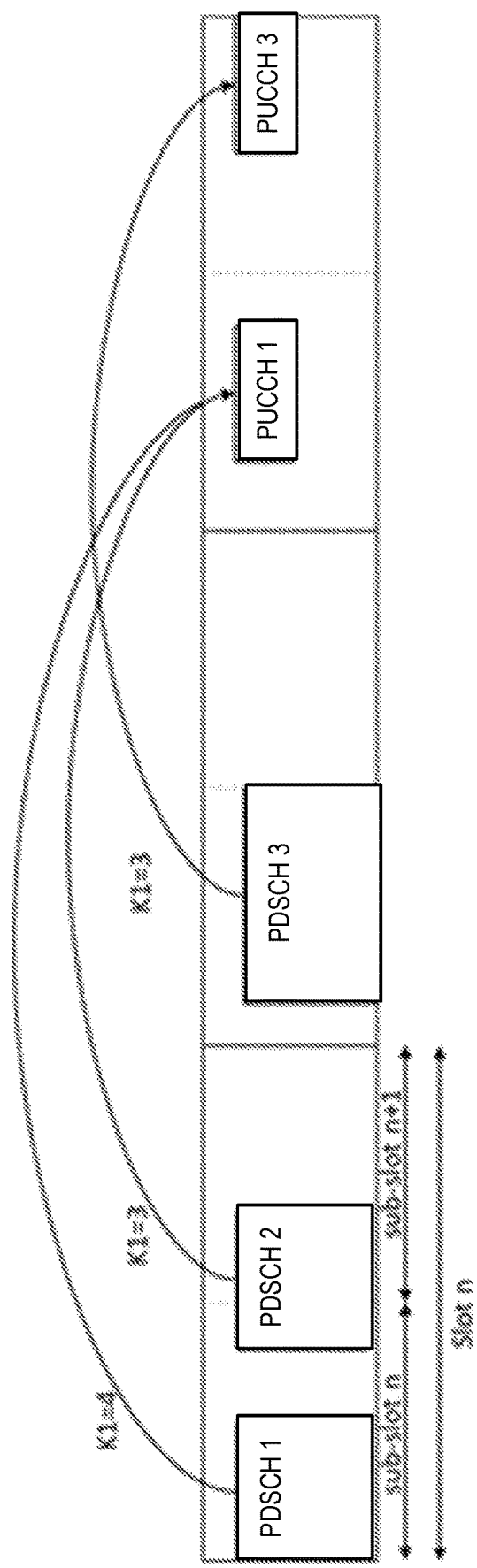
FIG. 3 shows an example where each PDSCH is associated with a certain sub-slot for Hybrid-Automatic Repeat Request (HARQ) feedback through the use of a $K_1$ value in units of sub-slots.

As discussed above, FIG. 3 shows an example where each PDSCH is associated with a certain sub-slot for HARQ feedback through the use of a K1 value in units of sub-slots.

There currently exist certain challenges. The current NR specification does not fully support Type-1 HARQ-ACK codebook for subslot-based HARQ-ACK.

When a UE determines a set of occasions for candidate PDSCH receptions or SPS PDSCH releases according to the pseudo-code, an UL slot in the pseudo-code is interpreted as UL sub-slot, whereas a DL slot is still considered in terms of a normal 14-symbol slot. This inconsistency in the reference for DL and UL slot can lead to problems where some invalid slot may be considered when determining the Type-1 HARQ-ACK codebook, e.g., in some case, an UL slot is mistakenly considered for determining candidate PDSCH receptions.

Systems and methods for providing feedback are provided. In some embodiments, a method performed by a wireless device for providing feedback includes: determining a set of occasions for candidate Physical Downlink Shared Channel (PDSCH) receptions taking into account the number of sub-slots in an Uplink (UL) slot; determining a set of occasions for Semi-Persistent Scheduling (SPS) PDSCH releases taking into account the number of sub-slots in an UL slot; the number of sub-slots in an UL slot is used to scale the number of Downlink (DL) slots within an UL slot when determining a set of occasions for candidate PDSCH receptions; and the number of sub-slots in an UL slot is used to scale the number of DL slots within an UL slot when determining a set of occasions for SPS PDSCH releases. In this way, some embodiments allow for a full support of Type-1 HARQ-ACK codebook for subslot-based HARQ-ACK. Some embodiments are simple to implement into the specification and preserve the existing behavior for the slot-based Type-1 HARQ-ACK codebook determination.

The following solutions can be applied to both HARQ-ACK feedback of dynamically scheduled PDSCH and that of DL SPS.

The solutions are described per DL component carrier (CC). In case of multiple DL, the same solution can be applied for each DL CC to form the overall HARQ-ACK codebook.

A person skilled in the art realizes that other combining embodiments and/or variants are possible.

Determination of PDSCH timing for Type-1 HARQ-ACK codebook for sub-slot

In one non-limiting embodiment, the number of sub-slots in an UL slot is taken into account when determining a set of occasions for candidate PDSCH receptions or SPS PDSCH releases.

In one non-limiting embodiment, the number of sub-slots in an UL slot is used to scale the number of DL slots within an UL slot when determining a set of occasions for candidate PDSCH receptions or SPS PDSCH releases.

In one version of the above embodiment, the number of sub-slots in an UL slot is used to divide the number of DL slots within an UL slot when determining a set of occasions for candidate PDSCH receptions or SPS PDSCH releases. This is to reflect the effective number of DL slots within an UL sub-slot.

For example, if the number of sub-slots in an UL slot is N, there are effectively $(2^{\mu_{DL}-\mu_{UL}})/N$ DL slots within an UL sub-slot. In case that $(2^{\mu_{DL}-\mu_{UL}})/N$ is not an integer, the floor or ceiling operation can be further considered.

In one non-limiting embodiment, the number of sub-slots in an UL slot is used to scale the number of UL slots within a DL slot when determining a set of occasions for candidate PDSCH receptions or SPS PDSCH releases.

In one version of the above embodiment, the number of sub-slots in an UL slot is used to multiply the number of UL slots within an DL slot when determining a set of occasions for candidate PDSCH receptions or SPS PDSCH releases to reflect the effective number of UL sub-slots within a DL slot.

For example, if the number of sub-slots in an UL slot is N, there are effectively $(2^{\mu_{UL}-\mu_{DL}}) \cdot N$ DL slots within an UL sub-slot. In case that $(2^{\mu_{UL}-\mu_{DL}}) \cdot N$ is not an integer, the floor or ceiling operation can be further considered.

Note that in the determination of a set of occasions for candidate PDSCH receptions or SPS PDSCH releases to form a Type-1 HARQ-ACK codebook for sub-slot HARQ-ACK, the number of sub-slots in an UL slot can be used to scale both the number of DL slots within an UL slot and the number of UL slots within a DL slot.

In the above embodiments, the number of DL slots within an UL slot can be expressed by $2^{\mu_{DL}-\mu_{UL}}$ and similarly the number of UL slots within an DL slot can be expressed by $2^{\mu_{UL}-\mu_{DL}}$, where the downlink SCS configuration $\mu_{DL}$ and the uplink SCS configuration $\mu_{UL}$ are provided by subcarrier-Spacing in bandwidth part (BWP)-Downlink and BWP-Uplink for the active DL BWP and the active UL BWP.

In the above embodiments, the number of sub-slots in an UL slot can be derived based on the sub-slot configuration, i.e., RRC parameter subslotLengthForPUCCH-r16 in PUCCH-Config IE. For example, let N be the number of sub-slots in an UL slot. For normal CP, if subslotLengthForPUCCH-r16=n2 (sub-slot length of two symbols), then N=7 as there are seven sub-slots in an UL slot. Similarly, for normal CP, if subslotLengthForPUCCH-r16=n7 (sub-slot length of seven symbols), then N=2 as there are two sub-slots in an UL slot.

Determination of TDRA entries for Type-1 HARQ-ACK codebook for sub-slot

For determining the Type-1 HARQ-ACK codebook with UL sub-slot, an HARQ-ACK bit is reserved for each possible PDSCH transmission in a slot. Thus, a set R is constructed to refer to a set of row indexes, and set R includes all possible combinations of {slot offsets $K_0$, start and length indicators SLIV, and PDSCH mapping types for PDSCH}. The set R are provided by the union of row indexes of time domain resource allocation tables for DCI formats the UE is configured to monitor PDCCH for serving cell c. Thus, the set R includes TDRA tables configured for all DCI formats that the UE monitors (e.g., DCI format 1_0,1_1,1_2). For DCI format 1_2, set R also includes the relative PDSCH resource allocation where the reference SLIV is used.

When dividing the DL slots into a set of DL sub-slots for Type-1 HARQ-ACK codebook, it is wasteful to include all entries of R in the Type-1 HARQ-ACK codebook construction. This is because the time domain scope for set R is an entire DL slot, not an individual DL sub-slot. Thus, for each DL sub-slot, only a subset of R is applicable. For DL sub-slot j, a set $R_{DL,subslot,j}$ can be constructed, where $R_{DL,subslot,j}$ is subset of R. Set $R_{DL,subslot,j}$ can be derived from set R by selecting from R all indices where the end symbol of the PDSCH resource allocation ends within the DL subslot j.

For PDSCH TDRA entries that do not use reference SLIV, the end symbol is provided by S+L, where S and L are both from a row of the TDRA table, and the number of consecutive symbols L counting from the starting symbol S allocated for the PDSCH defines the scheduled time domain resource. For DCI format(s) that use reference SLIV, the end symbol is provided by $S_0$+S+L, where $S_0$ refers to the starting symbol the PDCCH monitoring occasion where the DCI format (e.g., DCI format 1_2) is detected.

The method described above can be realized by the text proposal example below.

---

TS 38.214 V16.3.0 section 9.1.2.1
   b) on a set of row indexes R of a table that is associated with the active DL BWP and defining respective sets of slot offsets $K_0$, start and length indicators SLIV, and PDSCH mapping types for PDSCH reception as described in [6, TS 38.214], where the row indexes R of the table are provided by the union of row indexes of time domain resource allocation tables for DCI formats the UE is configured to monitor PDCCH for serving cell c
   a) if the UE is provided ReferenceofSLIV-ForDCIFormat1_2, for each row index with slot offset $K_0$ = 0 and PDSCH mapping Type B in a set of row indexes of a table for DCI format 1_2 [6, TS 38.214], for each PDCCH monitoring occasion in a set of PDCCH monitoring occasions with different starting symbols within a slot where the UE monitors PDCCH for DCI format 1_2 and with starting symbol $S_0$ > 0, if S + $S_0$ + L ≤ 14 for normal cyclic prefix and S + $S_0$ + L ≤ 12 for extended cyclic prefix, add a new row index in the set of row indexes of the table by replacing the starting symbol S of the row index by S + $S_0$

...

Set $n_D$ = 0 – index of a DL slot within an UL slot
while$n_D$ < max($\lfloor (2^{\mu_{DL}-\mu_{UL}})/N \rfloor$, 1)
   Set R = $R_{DL,subslot,j}$ to the set of rows where j refers to the set of indices where the end symbols are within DL slot $n_D$
   Set $\mathscr{C}$(R) to the cardinality of $R_{DL,subslot,j}$
   Set r=0 – index of row in set R Another alternative to the above method is to derive the set $R_{DL,subslot,j}$ by partitioning the set of all TDRA entries R according to starting point of TDRA entries belonging to each DL sub-slot j.

Figure 5:
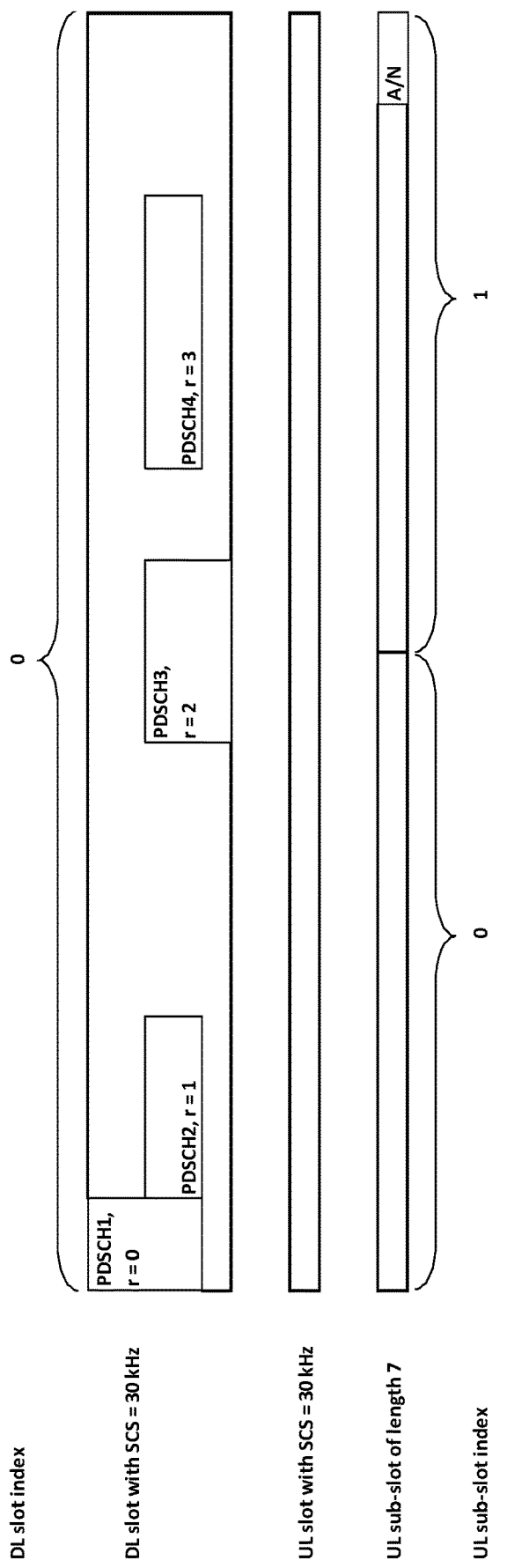
FIG. 5 illustrates an example of $R_{DL,subslot,k}$ where $R_{DL,subslot,k}=\{0, 1\}$ for HARQ-ACK sent in UL sub-slot $n_U=1$ with $K_{1,k}=1$, there are two TDRA entries (r=0 and r=1) which end within DL slot $n_D=0$ and within the corresponding UL sub-slot index $n_U-K_{1,k}=1-1=0$, according to some embodiments of the present disclosure.

In the text proposal example above, for HARQ-ACK sent on UL sub-slot $n_U$, it is also possible to replace the set $R_{DL,subslot,j}$ by $R_{DL,subslot,k}$ where $R_{DL,subslot,k}$ refers to the set of row indices with corresponding TDRA entries ending within DL slot $n_D$ and within the corresponding UL sub-slot $n_U-K_{1,k}$. See FIG. 5 for an illustrating example. FIG. 5 illustrates an example of $R_{DL,subslot,k}$ where $R_{DL,subslot,k}=\{0, 1\}$ for HARQ-ACK sent in UL sub-slot $n_U=1$ with $K_{1,k}=1$, there are two TDRA entries (r=0 and r=1) which end within DL slot $n_D=0$ and within the corresponding UL sub-slot index $n_U-K_{1,k}=1-1=0$.

Figure 6:
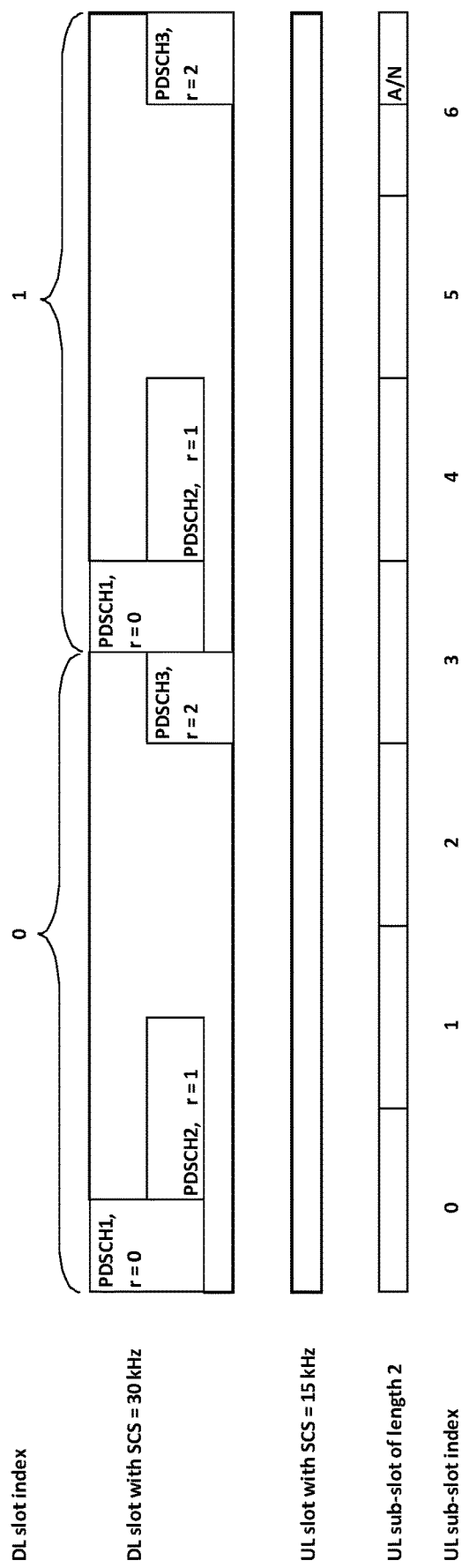
FIG. 6 illustrates an example of $R_{DL,subslot,k}$ where $R_{DL,subslot,k}=\{0, 2\}$ for HARQ-ACK sent in UL sub-slot $n_U=6$ with $K_{1,k}=3$, there are two TDRA entries (r=2 and r=0) which end within the corresponding UL sub-slot index $n_U-K_{1,k}=6-3=3$, according to some embodiments of the present disclosure.

In some cases, the UL sub-slot $n_U-K_{1,k}$ may overlap with multiple DL slots. In such cases, the set $R_{DL,subslot,k}$ can refer to the set of row indices with corresponding TDRA entries ending within the corresponding UL sub-slot $n_U-K_{1,k}$, where the TDRA entries may map from different DL slots. See FIG. 6 for an illustrating example. FIG. 6 illustrates an example of $R_{DL,subslot,k}$ where $R_{DL,subslot,k}=\{0, 2\}$ for HARQ-ACK sent in UL sub-slot $n_U=6$ with $K_{1,k}=3$, there are two TDRA entries (r=2 and r=0) which end within the corresponding UL sub-slot index $n_U-K_{1,k}=6-3=3$.

Example of how the solutions are implemented into the specification for Type-1 HARQ-ACK codebook for sub-slot The following paragraphs provide an example of how the solutions described in the above embodiments can be implemented into the specification (Section 9.1.2.1, 3GPP TS 38.213 v16.3.0) for the determination of a set of occasions for candidate PDSCH receptions or SPS PDSCH releases when constructing the Type-1 HARQ-ACK codebook.

If a UE is not provided a ca-SlotOffset for any serving cell of PDSCH receptions and for the serving cell of corresponding PUCCH transmission with HARQ-ACK information, the UE determines a set of occasions for candidate PDSCH receptions or SPS PDSCH releases according to the following pseudo-code.

For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a single SPS PDSCH release is same as for a corresponding SPS PDSCH reception. A location in the Type-1 HARQ-ACK codebook for HARQ-ACK information corresponding to multiple SPS PDSCH releases by a single DCI format is same as for a corresponding SPS PDSCH reception with the lowest SPS configuration index among the multiple SPS PDSCH releases.
Set j=0 – index of occasion for candidate PDSCH reception or SPS PDSCH release
Set B=∅
Set $M_{A,c}$ = ∅
Set $\mathcal{C}(K_1)$ to the cardinality of set $K_1$
Set k =0 – index of slot timing values $K_{1,k}$, in descending order of the slot timing values, in set $K_1$ for serving cell C
while k < $\mathcal{C}(K_1)$
    if mod $((n_U - K_{1,k}) + 1, \max(2^{\mu_{DL}-\mu_{UL}}, 1)) = 0$
        Set $n_D$ = 0 – index of a DL slot within an UL slot
        while $n_D$ < $\max(\lfloor (2^{\mu_{DL}-\mu_{UL}})/N \rfloor, 1)$
            Set R to the set of rows
            Set $\mathcal{C}(R)$ to the cardinality of R
            Set r=0 – index of row in set R
            if slot $n_U$ starts at a same time as or after a slot for an active DL BWP change on serving cell c or an active UL BWP change on the PCell and slot $\lfloor (n_U - K_{1,k}) \cdot (2^{\mu_{DL}-\mu_{UL}})/N \rfloor + n_D$, is before the slot for the active DL BWP change on serving cell c or the active UL BWP change on the PCell
                $n_D = n_D + 1$;
            else
                while r < $\mathcal{C}(R)$
                    if the UE is provided tdd-UL-DL-ConfigurationCommon, or tdd-UL-DL-ConfigurationDedicated and, for each slot from slot $\lfloor (n_U - K_{1,k}) \cdot (2^{\mu_{DL}-\mu_{UL}})/N \rfloor + n_D - N_{PDSCH}^{repeat,max} + 1$ to slot $\lfloor (n_U - K_{1,k}) \cdot (2^{\mu_{DL}-\mu_{UL}})/N \rfloor + n_D$, at least one symbol of the PDSCH time resource derived by row r is configured as UL where $K_{1,k}$ is the k-th slot timing value in set $K_1$,
                        R=R\r;
                    else
                        r = r + 1;
                    end if
                end while
                if the UE does not indicate a capability to receive more than one unicast PDSCH per slot and R≠∅,
                    $M_{A,c} = M_{A,c} \cup j$;
                    j = j+1;
                else
                    Set $\mathcal{C}(R)$ to the cardinality of R
                    Set m to the smallest last OFDM symbol index, as determined by the SLIV, among all rows of R
                    while R≠∅
                        Set r=0
                        while r < $\mathcal{C}(R)$
                            if S ≤ m for start OFDM symbol index S for row r
                                $b_{r,k,n_D}$ = j; - index of occasion for candidate PDSCH reception or SPS PDSCH release associated with row r
                                R = R\r;
                                B = B∪$_{r,k,n_D}$ ;

```
            else
                r = r + 1;
            end if
        end while
        M_{A,c} = M_{A,c} ∪ j;
        j = j + 1;
        Set m to the smallest last OFDM symbol index among all rows of R ;
        end while
      end if
      n_D = n_D + 1;
    end if
  end while
 end if
 k = k + 1;
end while
```

Here, the bolded parts above show the changes from the current specification where the number of sub-slots in an UL slot, N, is taken into account in the pseudo code.

The specific part shown in bold text above $(2^{\mu_{UL}-\mu_{DL}})$ can be alternatively replaced by $(2^{\mu_{UL}-\mu_{DL}}) \cdot N$, $\lfloor (2^{\mu_{UL}-\mu_{DL}}) \cdot N \rfloor$, $\lceil (2^{\mu_{UL}-\mu_{DL}}) \cdot N \rceil$, or $$\left\lfloor \frac{(2^{\mu_{UL}-\mu_{DL}}) \cdot N}{2} \right\rfloor \cdot 2.$$

Note that similar solutions can be considered for the case where a UE is provided ca-SlotOffset for some serving cell of PDSCH receptions or for the serving cell of corresponding PUCCH transmission with HARQ-ACK information.

HARQ-ACK Bit Mapping in the Type-1 HARQ-ACK Codebook for Sub-Slot

In one non-limiting embodiment, for each UL sub-slot $n_U$, the UE determines the number of corresponding HARQ-ACK bits ($O_{n_U}$) which are possible to map to the UL sub-slot $n_U$ according to a set of slot timing values $K_1$ and corresponding TDRA entries which end in UL sub-slot $n_U-K_1$.

In some cases, the determined size of codebook according to the above embodiments (i.e., the cardinality of the set of $M_{A,c}$ occasions for candidate PDSCH receptions or SPS PDSCH releases) can be larger than $O_{n_U}$. In such cases, the UE maps the possible corresponding HARQ-ACK bits to the first $O_{n_U}$ bits of the HARQ-ACK codebook and fill the remaining bits of the codebook with NACK.

Restriction of Type-1 HARQ-ACK Codebook for Sub-Slot HARQ-ACK

In one non-limiting embodiment, Type-1 HARQ-ACK codebook for sub-slot HARQ-ACK is supported only when $(2^{\mu_{UL}-\mu_{DL}}) \cdot N$ is an integer number.

In one non-limiting embodiment, Type-1 HARQ-ACK codebook for sub-slot HARQ-ACK is supported only when the downlink SCS configuration $\mu_{DL}$ is smaller than or equal to the uplink SCS configuration $\mu_{UL}$.

In one non-limiting embodiment, Type-1 HARQ-ACK codebook for sub-slot HARQ-ACK is supported only when the downlink SCS configuration $\mu_{DL}$ is larger than or equal to the uplink SCS configuration $\mu_{UL}$.

In one non-limiting embodiment, Type-1 HARQ-ACK codebook for sub-slot HARQ-ACK is supported only when subslotLengthForPUCCH-r16=n7 for normal CP.

In one non-limiting embodiment, Type-1 HARQ-ACK codebook for sub-slot HARQ-ACK is supported only when subslotLengthForPUCCH-r16=n6 for extended CP.

Reinterpretation of DL Slot in Terms of Sub-Slot

In an alternative solution, DL slot is considered in terms of sub-slot following the sub-slot length configuration, i.e., for the purpose of determining Type-1 HARQ-ACK codebook for sub-slot-based HARQ-ACK, DL slot can be assumed to consists of multiple DL sub-slots. That is, sub-slot length is used to form DL sub-slots. The DL sub-slots are then used for Type-1 HARQ-ACK codebook determination.

Mapping of HARQ-ACK Bits into Type-1 HARQ Codebook Construction

Figure 7:
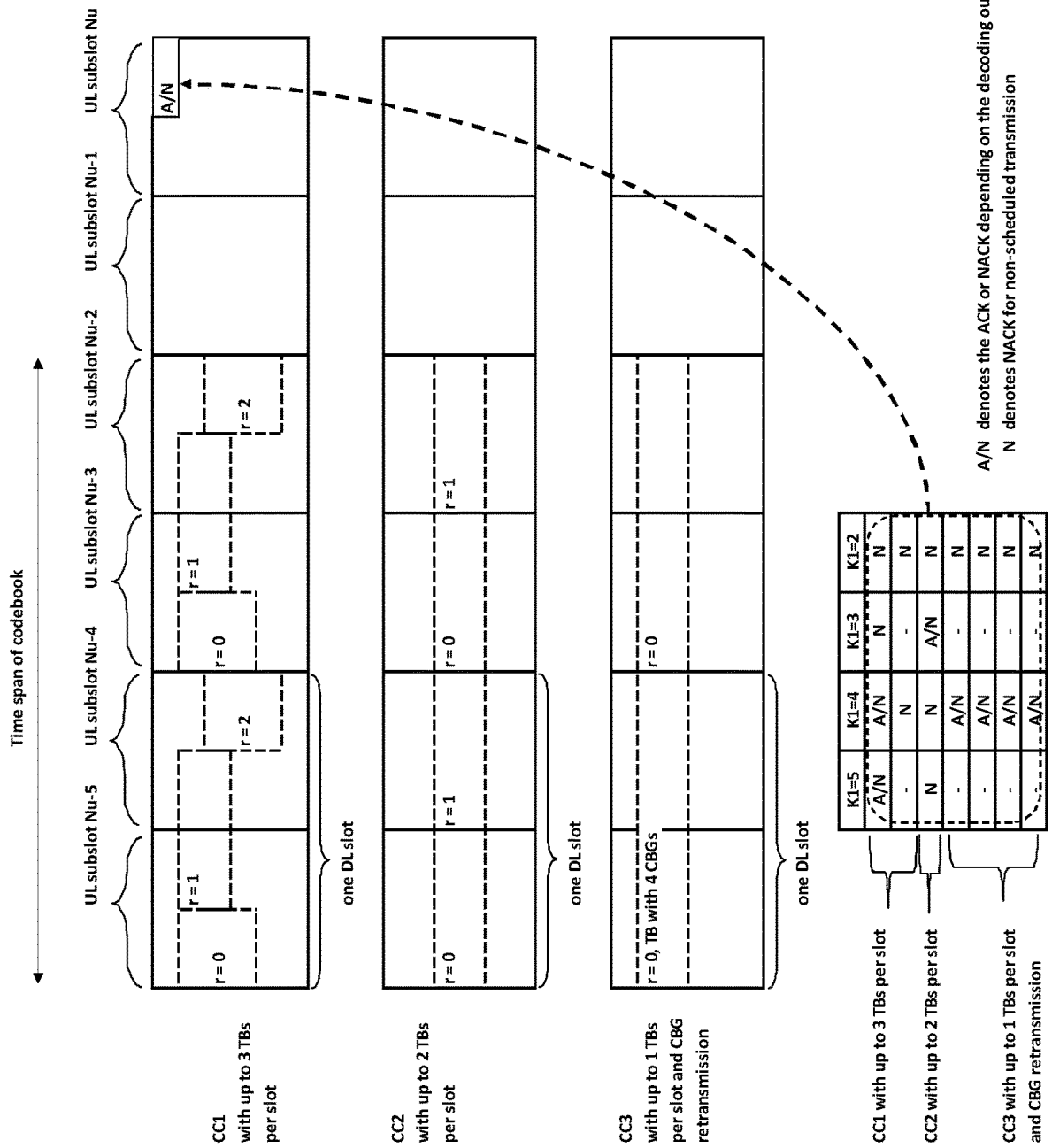
FIG. 7 illustrates an example with multiple CCs for PDSCH scheduling with their HARQ-ACKs transmitted based on Type 1 HARQ codebook in sub-slot Nu, according to some embodiments of the present disclosure.

FIG. 7 illustrates an example with multiple CCs for PDSCH scheduling with their HARQ-ACKs transmitted based on Type 1 HARQ codebook in sub-slot Nu. Note that here only TDRA entries with the ending symbol within subslot Nu-K1 is considered for possible A/N bits in the codebook example above. In FIG. 7 there are multiple component carriers (CC) for PDSCH scheduling and the corresponding HARQ-ACK is transmitted in a sub-slot Nu of the CC1.

The following procedure can be utilized for HARQ-ACK bit mapping into the Type-1 HARQ-ACK codebook in a non-limiting manner. It can also be extended to any number of CCs.

Based on the set of PDSCH reception occasions according to the configured TDRA entries in a slot, for each CC, the corresponding HARQ-ACK bits for scheduled PDSCH ending in a sub-slot are mapped into a codebook spanning a time window which is determined from the set of slot timing K1. The overall size of the codebook also depends on the number of possible PDSCH reception candidates in a slot, the number of CCs, the number multiple input/multiple out (MIMO) layers, and whether CBG retransmission is enabled.

In FIG. 7, CC1 is shown with three different TDRA entries in a slot where the first entry (r=0) ends in one corresponding UL sub-slot whereas the remaining two (r=1, r=2) end in another corresponding sub-slot. Actual scheduled PDSCHs are indicated by the color filled boxes. For CC3, up to one scheduled PDSCH per slot is allowed with CBG retransmission (with 4 CBGs). In this case, four HARQ-ACK bits are reported.

The mapping of HARQ-ACK bits into the codebook are as follows:
  Ack/Nack (A/N) bit is reported for the scheduled PDSCHs in the designated placeholders in the sub-slot-based Type-1 HARQ CB.

Figure 8:
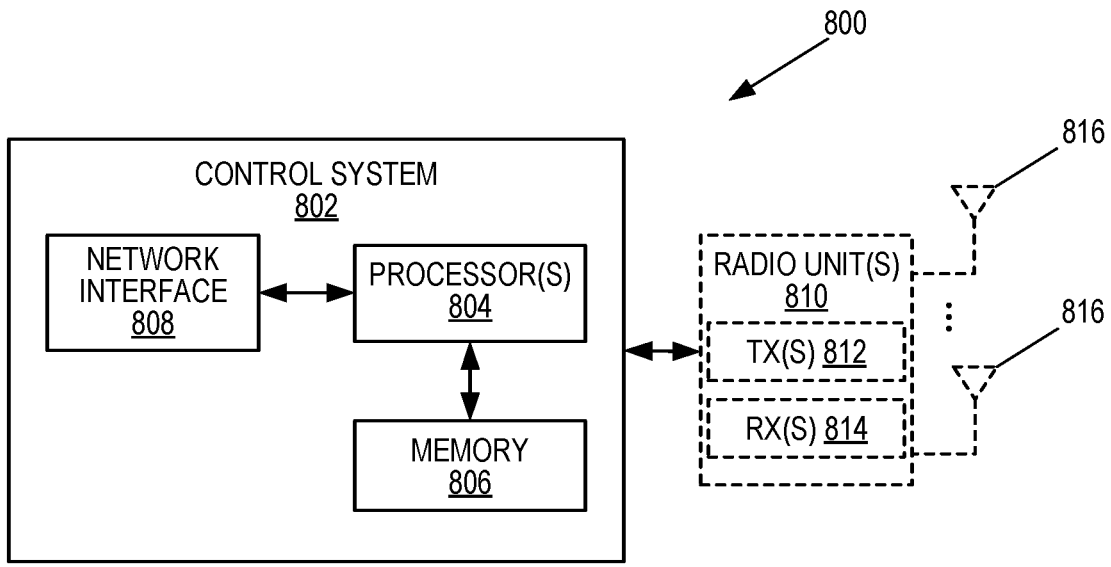
FIG. 8 is a schematic block diagram of a radio access node, according to some embodiments of the present disclosure.

FIG. 8 is a schematic block diagram of a radio access node 800 according to some embodiments of the present disclosure. Optional features are represented by dashed boxes. The radio access node 800 may be, for example, a base station 402 or 406 or a network node that implements all or part of the functionality of the base station 402 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
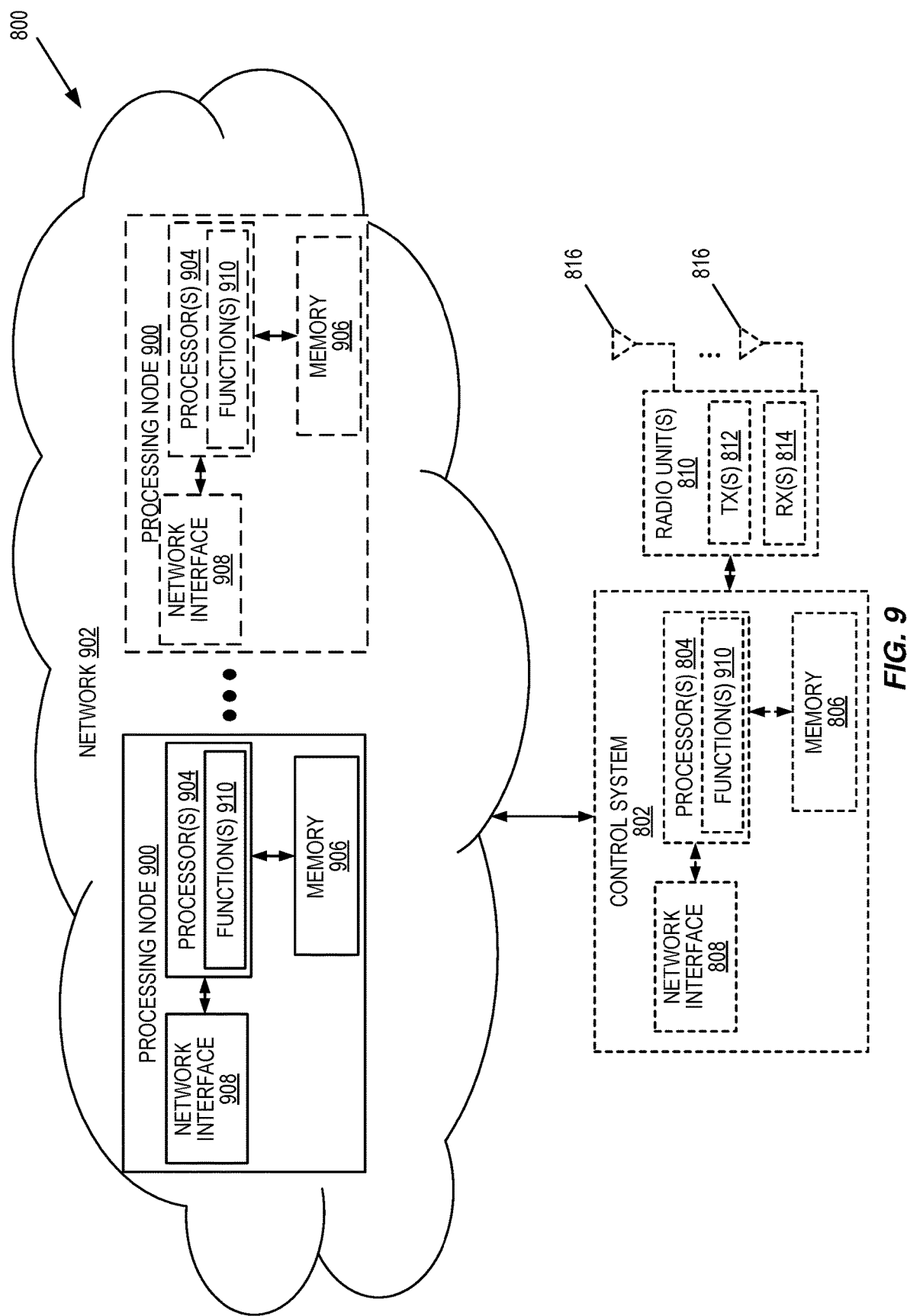
FIG. 9 is a schematic block diagram that illustrates a virtualized embodiment of the radio access node according to some embodiments of the present disclosure.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
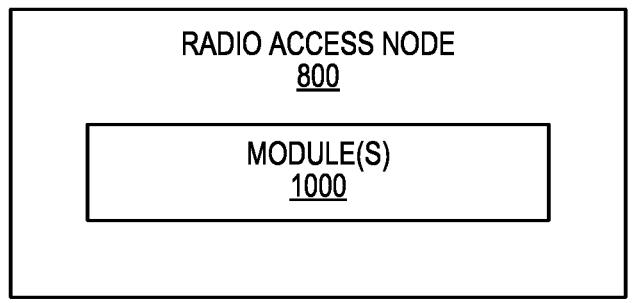
FIG. 10 is a schematic block diagram of the radio access node according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
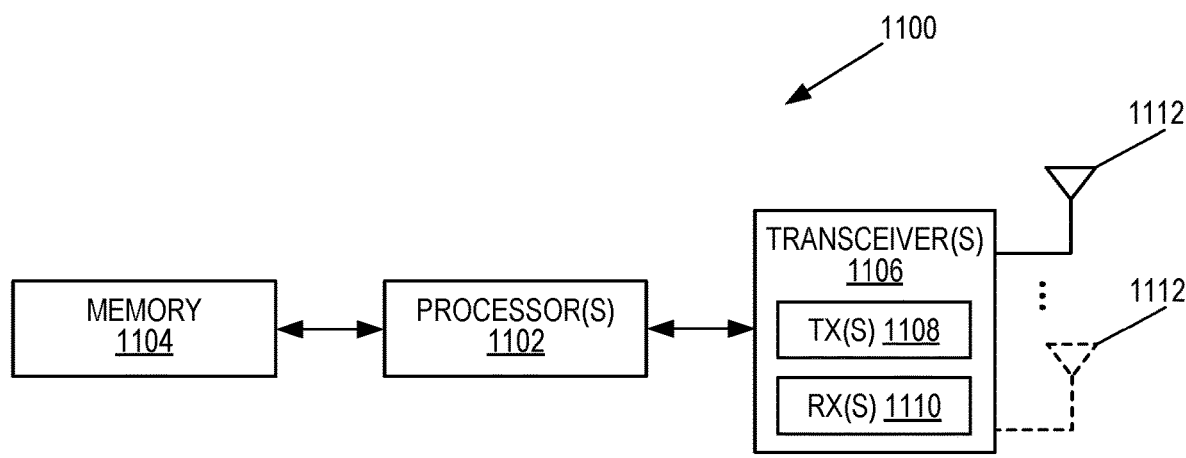
FIG. 11 is a schematic block diagram of a wireless communication device according to some embodiments of the present disclosure.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
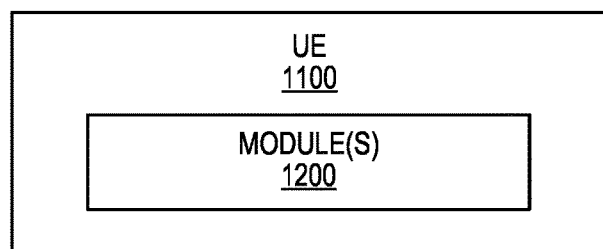
FIG. 12 is a schematic block diagram of the wireless communication device according to some other embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Figure 13:
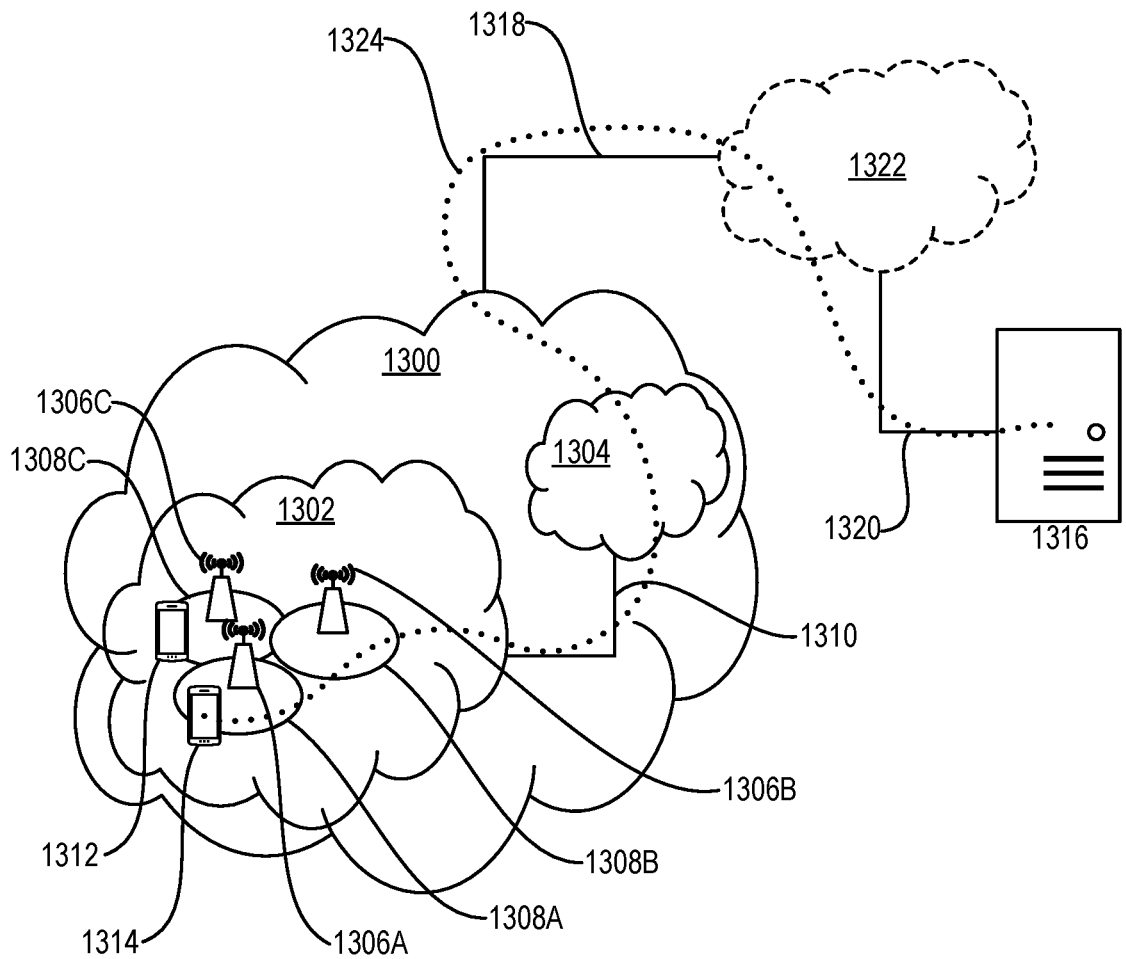
FIG. 13, in accordance with an embodiment, a communication system includes a telecommunication network, such as a 3GPP-type cellular network, which comprises an access network, such as a RAN, and a core network, according to some embodiments of the present disclosure.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
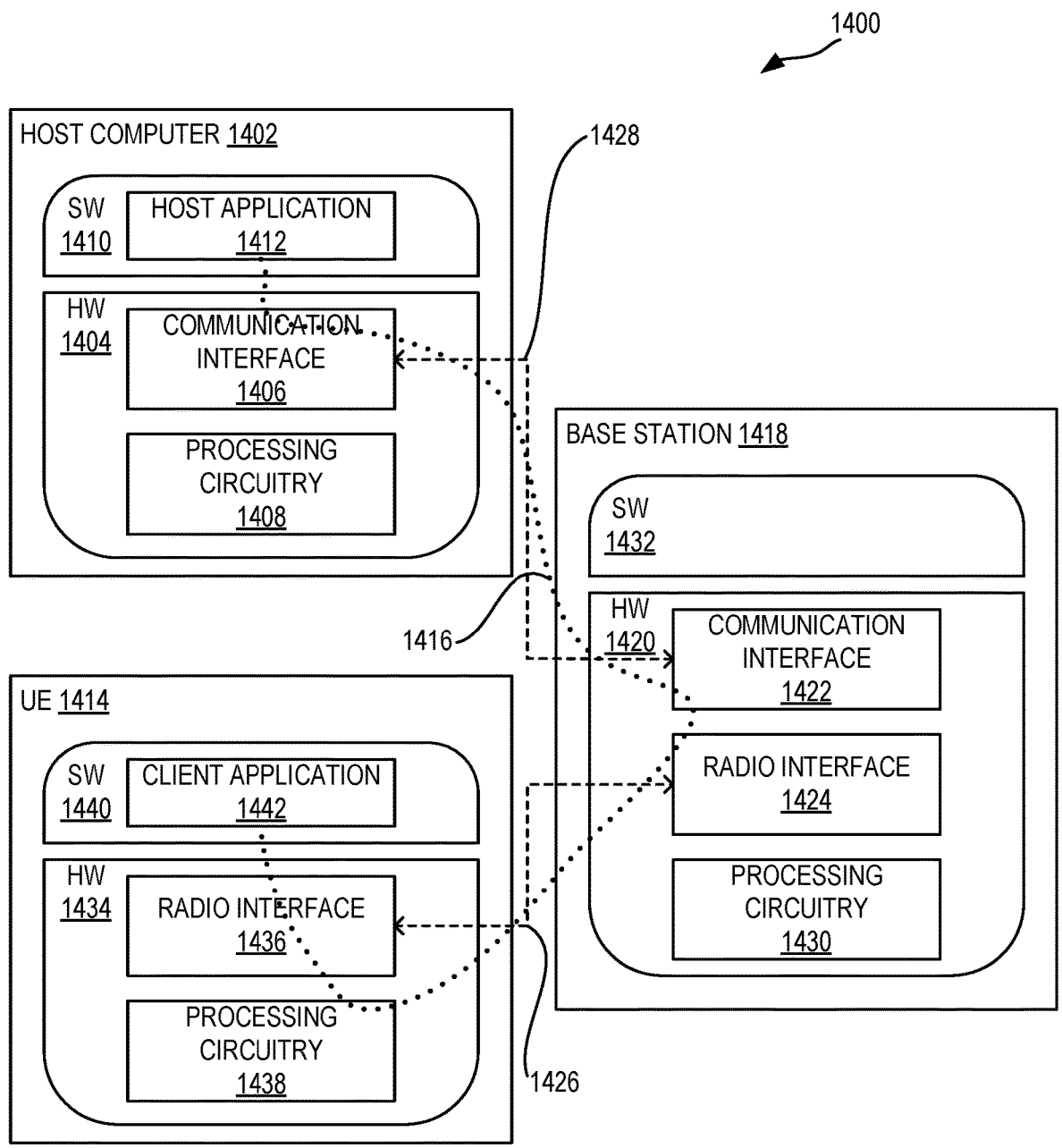
FIG. 14 illustrates a communication system, a host computer comprises hardware including a communication interface configured to set up and maintain a wired or wireless connection with an interface of a different communication device of the communication system, according to some embodiments of the present disclosure.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

Figures 17, 18:
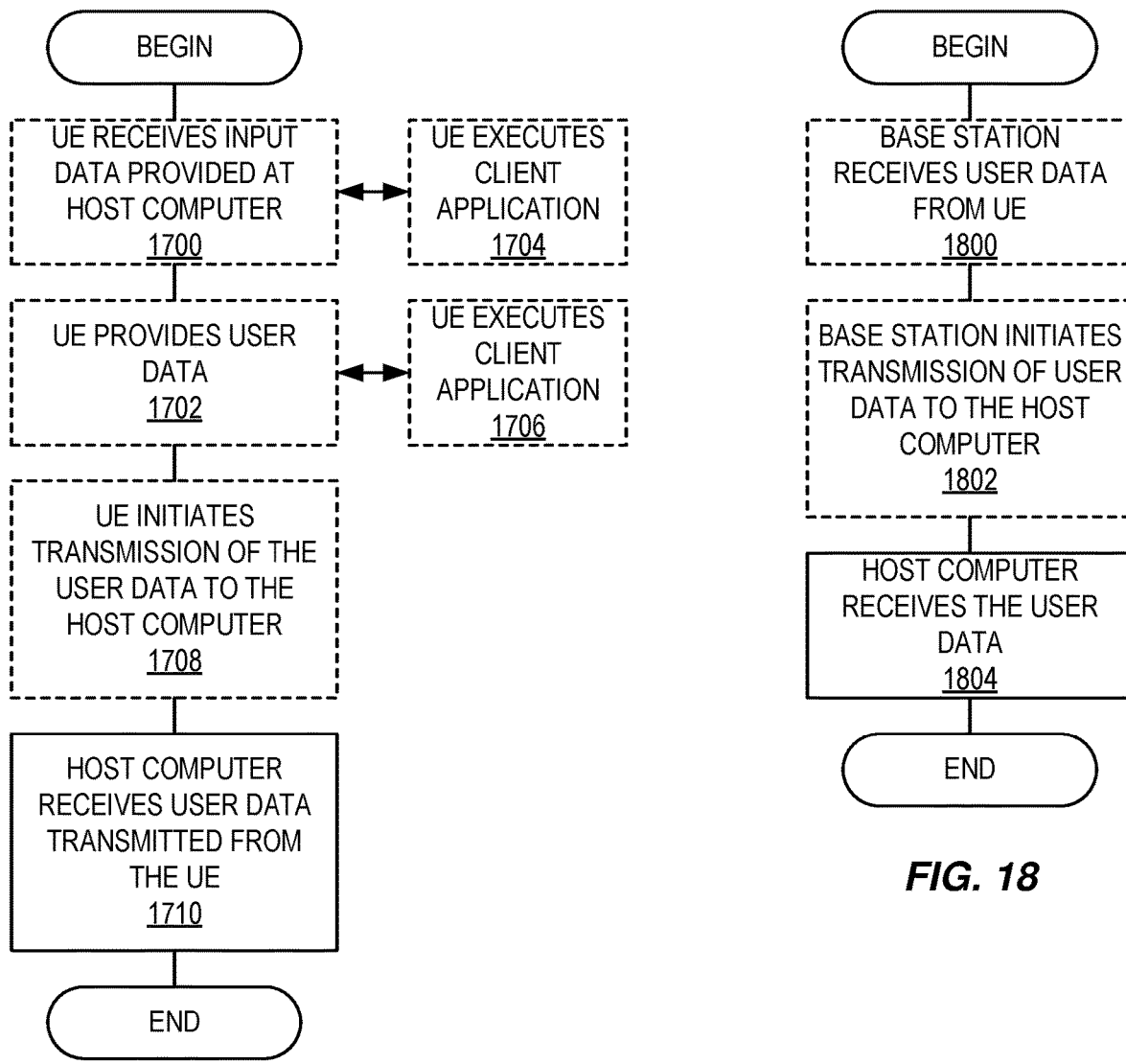

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally, or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some embodiments are described below.

Group A Embodiments

Embodiment 1: A method performed by a wireless device for providing feedback, the method comprising one or more of: determining a set of occasions for candidate Physical Downlink Shared Channel, PDSCH, receptions taking into account the number of sub-slots in an Uplink, UL, slot; determining a set of occasions for Semi-Persistent Scheduling, SPS, PDSCH releases taking into account the number of sub-slots in an UL slot; the number of sub-slots in an UL slot is used to scale the number of Downlink, DL, slots within an UL slot when determining a set of occasions for candidate PDSCH receptions; and the number of sub-slots in an UL slot is used to scale the number of DL slots within an UL slot when determining a set of occasions for SPS PDSCH releases.

Embodiment 2: The method of any of the previous embodiments wherein the number of sub-slots in an UL slot is used to divide the number of DL slots within an UL slot when determining a set of occasions for candidate PDSCH receptions or SPS PDSCH releases.

Embodiment 3: The method of any of the previous embodiments wherein if the number of sub-slots in an UL slot is N, there are effectively ($2^{\mu_{DL}-\mu_{UL}}$)/N DL slots within an UL sub-slot.

Embodiment 4: The method of any of the previous embodiments wherein the number of sub-slots in an UL slot is used to scale the number of UL slots within a DL slot when determining a set of occasions for candidate PDSCH receptions or SPS PDSCH releases.

Embodiment 5: The method of any of the previous embodiments wherein the number of sub-slots in an UL slot is used to multiply the number of UL slots within an DL slot when determining a set of occasions for candidate PDSCH receptions or SPS PDSCH releases to reflect the effective number of UL sub-slots within a DL slot.

Embodiment 6: The method of any of the previous embodiments wherein the number of sub-slots in an UL slot can be used to scale both the number of DL slots within an UL slot and the number of UL slots within a DL slot.

Embodiment 7: The method of any of the previous embodiments wherein the number of DL slots within an UL slot can be expressed by $2^{\mu_{DL}-\mu_{UL}}$ and similarly the number of UL slots within an DL slot can be expressed by $2^{\mu_{UL}-\mu_{DL}}$, where the downlink SCS configuration $\mu_{DL}$ and the uplink SCS configuration $\mu_{UL}$ are provided by subcarrierSpacing in BWP-Downlink and BWP-Uplink for the active DL BWP and the active UL BWP.

Embodiment 8: The method of any of the previous embodiments wherein the number of sub-slots in an UL slot can be derived based on the sub-slot configuration, i.e., RRC parameter subslotLengthForPUCCH-r16 in PUCCH-Config IE.

Embodiment 9: The method of any of the previous embodiments, further comprising: providing user data; and forwarding the user data to a host computer via the transmission to the base station.

Group B Embodiments

Embodiment 10: A method performed by a base station for receiving feedback, the method comprising one or more of: determining a set of occasions for candidate Physical Downlink Shared Channel, PDSCH, receptions taking into account the number of sub-slots in an Uplink, UL, slot; determining a set of occasions for Semi-Persistent Scheduling, SPS, PDSCH releases taking into account the number of sub-slots in an UL slot; the number of sub-slots in an UL slot is used to scale the number of Downlink, DL, slots within an UL slot when determining a set of occasions for candidate PDSCH receptions; and the number of sub-slots in an UL slot is used to scale the number of DL slots within an UL slot when determining a set of occasions for SPS PDSCH releases.

Embodiment 11: The method of any of the previous embodiments wherein the number of sub-slots in an UL slot is used to divide the number of DL slots within an UL slot when determining a set of occasions for candidate PDSCH receptions or SPS PDSCH releases.

Embodiment 12: The method of any of the previous embodiments wherein if the number of sub-slots in an UL slot is N, there are effectively ($2^{\mu_{DL}-\mu_{UL}}$)/N DL slots within an UL sub-slot.

Embodiment 13: The method of any of the previous embodiments wherein the number of sub-slots in an UL slot is used to scale the number of UL slots within a DL slot when determining a set of occasions for candidate PDSCH receptions or SPS PDSCH releases.

Embodiment 14: The method of any of the previous embodiments wherein the number of sub-slots in an UL slot is used to multiply the number of UL slots within an DL slot when determining a set of occasions for candidate PDSCH receptions or SPS PDSCH releases to reflect the effective number of UL sub-slots within a DL slot.

Embodiment 15: The method of any of the previous embodiments wherein the number of sub-slots in an UL slot can be used to scale both the number of DL slots within an UL slot and the number of UL slots within a DL slot.

Embodiment 16: The method of any of the previous embodiments wherein the number of DL slots within an UL slot can be expressed by $2^{\mu_{DL}-\mu_{UL}}$ and similarly the number of UL slots within an DL slot can be expressed by $2^{\mu_{UL}-\mu_{DL}}$, where the downlink SCS configuration $\mu_{DL}$ and the uplink SCS configuration $\mu_{UL}$ are provided by subcarrierSpacing in BWP-Downlink and BWP-Uplink for the active DL BWP and the active UL BWP.

Embodiment 17: The method of any of the previous embodiments wherein the number of sub-slots in an UL slot can be derived based on the sub-slot configuration, i.e., RRC parameter subslotLengthForPUCCH-r16 in PUCCH-Config IE.

Embodiment 18: The method of any of the previous embodiments, further comprising: obtaining user data; and forwarding the user data to a host computer or a wireless device.

Group C Embodiments

Embodiment 19: A wireless device for providing feedback, the wireless device comprising: processing circuitry configured to perform any of the steps of any of the Group A embodiments; and power supply circuitry configured to supply power to the wireless device.

Embodiment 20: A base station for receiving feedback, the base station comprising: processing circuitry configured to perform any of the steps of any of the Group B embodiments; and power supply circuitry configured to supply power to the base station.

Embodiment 21: A User Equipment, UE, for providing feedback, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 22: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 23: The communication system of the previous embodiment further including the base station.

Embodiment 24: The communication system of the previous 2 embodiments, further including the UE, wherein the UE is configured to communicate with the base station.

Embodiment 25: The communication system of the previous 3 embodiments, wherein: the processing circuitry of the host computer is configured to execute a host application, thereby providing the user data; and the UE comprises processing circuitry configured to execute a client application associated with the host application.

Embodiment 26: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 27: The method of the previous embodiment, further comprising, at the base station, transmitting the user data.

Embodiment 28: The method of the previous 2 embodiments, wherein the user data is provided at the host computer by executing a host application, the method further comprising, at the UE, executing a client application associated with the host application.

Embodiment 29: A User Equipment, UE, configured to communicate with a base station, the UE comprising a radio interface and processing circuitry configured to perform the method of the previous 3 embodiments.

Embodiment 30: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 31: The communication system of the previous embodiment, wherein the cellular network further includes a base station configured to communicate with the UE.

Embodiment 32: The communication system of the previous 2 embodiments, wherein: the processing circuitry of the host computer is configured to execute a host application, thereby providing the user data; and the UE's processing circuitry is configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 34: The method of the previous embodiment, further comprising at the UE, receiving the user data from the base station.

Embodiment 35: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 36: The communication system of the previous embodiment, further including the UE.

Embodiment 37: The communication system of the previous 2 embodiments, further including the base station, wherein the base station comprises a radio interface configured to communicate with the UE and a communication interface configured to forward to the host computer the user data carried by a transmission from the UE to the base station.

Embodiment 38: The communication system of the previous 3 embodiments, wherein: the processing circuitry of the host computer is configured to execute a host application; and the UE's processing circuitry is configured to execute a client application associated with the host application, thereby providing the user data.

Embodiment 39: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 40: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 41: The method of the previous embodiment, further comprising, at the UE, providing the user data to the base station.

Embodiment 42: The method of the previous 2 embodiments, further comprising: at the UE, executing a client application, thereby providing the user data to be transmitted; and at the host computer, executing a host application associated with the client application.

Embodiment 43: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 44: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 45: The communication system of the previous embodiment further including the base station.

Embodiment 46: The communication system of the previous 2 embodiments, further including the UE, wherein the UE is configured to communicate with the base station.

Embodiment 47: The communication system of the previous 3 embodiments, wherein: the processing circuitry of the host computer is configured to execute a host application; and the UE is configured to execute a client application associated with the host application, thereby providing the user data to be received by the host computer.

Embodiment 48: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 49: The method of the previous embodiment, further comprising at the base station, receiving the user data from the UE.

Embodiment 50: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

We claim:

1. A method performed by a wireless device for providing feedback, the method comprising:
determining a set of occasions for candidate Physical Downlink Shared Channel (PDSCH) receptions taking into account a number of sub-slots in an Uplink (UL) slot;
determining a set of occasions for Semi-Persistent Scheduling (SPS) PDSCH releases taking into account the number of sub-slots in the UL slot; and
utilizing the set of occasions for PDSCH receptions and/or the set of occasions for SPS PDSCH releases in communication with a base station.

2. The method of claim 1 wherein the number of sub-slots in the UL slot is used to scale a number of Downlink (DL) slots within the UL slot when determining the set of occasions for candidate PDSCH receptions.

3. The method of claim 1 wherein the number of sub-slots in the UL slot is used to scale the number of DL slots within the UL slot when determining the set of occasions for SPS PDSCH releases.

4. The method of claim 1 wherein the number of sub-slots in the UL slot is used to divide the number of DL slots within the UL slot when determining the set of occasions for candidate PDSCH receptions or SPS PDSCH releases.

5. The method of claim 1 wherein if the number of sub-slots in the UL slot is N, there are effectively $(2^{\mu_{DL}-\mu_{UL}})/N$ DL slots within a UL sub-slot.

6. The method of claim 1 wherein the number of sub-slots in the UL slot is used to scale the number of UL slots within a DL slot when determining the set of occasions for candidate PDSCH receptions or SPS PDSCH releases.

7. The method of claim 1 wherein the number of sub-slots in the UL slot is used to multiply the number of UL slots within a DL slot when determining the set of occasions for candidate PDSCH receptions or SPS PDSCH releases to reflect an effective number of UL sub-slots within a DL slot.

8. The method of claim 1 wherein the number of sub-slots in the UL slot can be used to scale both the number of DL slots within the UL slot and the number of UL slots within a DL slot.

9. The method of claim 1 wherein the number of DL slots within the UL slot can be expressed by $2^{\mu_{DL}-\mu_{UL}}$ and similarly the number of UL slots within a DL slot can be expressed by $2^{\mu_{UL}-\mu_{DL}}$, where a downlink Subcarrier Spacing (SCS) configuration $\mu_{DL}$ and an uplink SCS configuration $\mu_{UL}$ are provided by subcarrierSpacing in Bandwidth Part (BWP)-Downlink and BWP-Uplink for an active DL BWP and an active UL BWP.

10. The method of claim 1 wherein the number of sub-slots in the UL slot can be derived based on a sub-slot configuration.

11. The method of claim 10 wherein the sub-slot configuration comprises an RRC parameter subslotLengthForPUCCH-r16 in PUCCH-Config IE.

12. A method performed by a base station for receiving feedback, the method comprising:
determining a set of occasions for candidate Physical Downlink Shared Channel, PDSCH, receptions taking into account a number of sub-slots in an Uplink (UL) slot;
determining a set of occasions for Semi-Persistent Scheduling (SPS) PDSCH releases taking into account the number of sub-slots in the UL slot; and
utilizing the set of occasions for PDSCH receptions and/or the set of occasions for SPS PDSCH releases in communication with wireless device.

13. The method of claim 12 wherein the number of sub-slots in the UL slot is used to scale a number of Downlink (DL) slots within the UL slot when determining a set of occasions for candidate PDSCH receptions.

14. The method of claim 12 wherein the number of sub-slots in the UL slot is used to scale the number of DL slots within the UL slot when determining the set of occasions for SPS PDSCH releases.

15. The method of claim 12 wherein the number of sub-slots in the UL slot is used to divide the number of DL slots within the UL slot when determining the set of occasions for candidate PDSCH receptions or SPS PDSCH releases.

16. The method of claim 12 wherein if the number of sub-slots in the UL slot is N, there are effectively $(2^{\mu_{DL}-\mu_{UL}})/N$ DL slots within a UL sub-slot.

17. The method of claim 12 wherein the number of sub-slots in the UL slot is used to scale the number of UL slots within a DL slot when determining the set of occasions for candidate PDSCH receptions or SPS PDSCH releases.

18. The method of claim 12 wherein the number of sub-slots in the UL slot is used to multiply the number of UL slots within a DL slot when determining the set of occasions for candidate PDSCH receptions or SPS PDSCH releases to reflect an effective number of UL sub-slots within a DL slot.

19. The method of claim 12 wherein the number of sub-slots in the UL slot can be used to scale both the number of DL slots within the UL slot and the number of UL slots within a DL slot.

20. The method of claim 12 wherein the number of DL slots within the UL slot can be expressed by $2^{\mu_{DL}-\mu_{UL}}$ and similarly the number of UL slots within a DL slot can be expressed by $2^{\mu_{UL}-\mu_{DL}}$, where a downlink Subcarrier Spacing (SCS) configuration $\mu_{DL}$ and an uplink SCS configuration $\mu_{UL}$ are provided by subcarrierSpacing in Bandwidth Part (BWP)-Downlink and BWP-Uplink for an active DL BWP and an active UL BWP.

21. The method of claim 12 wherein the number of sub-slots in the UL slot can be derived based on a sub-slot configuration.

22. The method of claim 21 wherein the sub-slot configuration comprises a Radio Resource Control (RRC) parameter subslotLengthForPhysical Uplink Control Channel (PUCCH)-r16 in PUCCH-Config Information Element (IE).

23. A wireless device for providing feedback, the wireless device comprising:
one or more processors; and
memory storing instructions executable by the one or more processors, whereby the wireless device is operable to:
determine a set of occasions for candidate Physical Downlink Shared Channel (PDSCH) receptions taking into account a number of sub-slots in an Uplink (UL) slot; and
determine a set of occasions for Semi-Persistent Scheduling (SPS) PDSCH releases taking into account the number of sub-slots in the UL slot.

24. A base station for priority level handling, the base station comprising:
one or more processors; and
memory comprising instructions to cause the base station to:
determine a set of occasions for candidate Physical Downlink Shared Channel, PDSCH, receptions taking into account a number of sub-slots in an Uplink (UL) slot; and
determine a set of occasions for Semi-Persistent Scheduling (SPS) PDSCH releases taking into account the number of sub-slots in the UL slot.

* * * * *